3,015,642
Patented Jan. 2, 1962

3,015,642
INCREASING THE PARTICLE SIZE OF SYNTHETIC RUBBER LATEX

Carl V. Bawn, Naugatuck, and Byron A. Hunter, Waterbury, Conn., assignors to United States Rubber Company, New York, N.Y., a corporation of New Jersey
No Drawing. Filed Nov. 28, 1958, Ser. No. 776,670
12 Claims. (Cl. 260—29.7)

This invention relates to increasing the particle size of synthetic rubber latices, and particularly to permit them to be concentrated to fluid latices of high solids content.

It is known to reduce the pH of synthetic rubber latices containing soap emulsifiers whereby the soap partially reacts with the acidic material used to reduce the pH to produce free soap-forming acid, thereby destabilizing the system and causing agglomeration of the dispersed rubber particles into particles of larger size. The pH of the latex may be raised after such increase in particle size to improve the stability of the latex, and such restabilized latex of large particle size may be concentrated to fluid latices of high solids content.

We have found that the increase in particle size of a synthetic rubber latex containing soap on reduction of the pH of the latex is much greater if the pH is reduced in the presence of polyethylene polyamine. Such latices on restabilization by raising the pH may readily be concentrated, preferably by evaporation concentration, to fluid high solids latices.

In carrying out the present invention, there is added to a synthetic rubber latex containing 2 to 10 parts of soap per 100 parts of latex solids and having a pH from 8 to 11 a small amount of polyethylene polyamine, viz 0.05% to 1% based on the weight of the latex solids. The pH of the latex is then reduced to within the range of 5.5 to 7.5 as by incorporating acidic material in the latex, i.e. material that produces hydrogen ions in aqueous medium, e.g. an acid such as carbon dioxide or formic acid or acetic acid, or a salt that hydrolyzes to form acid such as sodium silicofluoride, or an ammonium salt of a strong acid, such as ammonium chloride, and formaldehyde which reacts with the ammonia to form hexamethylenetetramine and liberates free hydrochloric acid. The pH of the latex is then increased to a pH of 8 to 11 as by the addition of ammonia or an amine or sodium or potassium hydroxide. The latex may be permitted to rest at room or elevated temperature after destabilization by lowering the pH and before raising the pH. The latex will conventionally have a solids content of 20% to 50%, and after the pH of the latex has been lowered to within the range of 5.5 to 7.5 in the presence of the polyethylene polyamine and then raised to 8 to 11, the latex may be concentrated to a solids content of 55% to 70%, giving a fluid high solids latex. The latex may be concentrated by increasing the solids content in known manner as by creaming with a vegetable mucilage, such as ammonium alginate. It is preferred, however, to increase the solids content by evaporation concentration. The temperature of treatment of the latex according to the present invention will generally be in the range from 0° C. to 100° C. The average particle diameter of latices to be treated according to the present invention may be from 500 to 1500 Angstrom units, and the average particle diameter of these latices may be increased by 200 to 2500 Angstrom units by the process of the present invention. The soaps in the latex from the polymerization, as is known, will be water-soluble soaps of soap-forming monocarboxylic acids, such as alkali-metal, ammonium and amine salts of higher fatty acids having 10 to 24 carbon atoms in the molecule or of rosin acids, including dehydrogenated, hydrogenated and disproportionated rosin acids. The latex may also contain other types of surface-active dispersing agents from the polymerization such as sulfonated or sulfated compounds having the general formula R—SO$_3$M or R—OSO$_3$M, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde. Such sulfonated and sulfated dispersing agents may be added to the latex before reducing the pH according to the present invention to assure stability to the latex during particle size enlargement and on concentrating the latex.

The polyethylene polyamines that may be used in the present invention are well known materials which are reaction products of ethylene dichloride and ammonia. One or a mixture of polyethylene polyamines may be used. Examples are diethylene triamine, triethylene tetramine, tetraethylene pentamine, pentaethylene hexamine, hexaethylene heptamine, heptaethylene octamine and higher polyethylene polyamines as in the still bottom from the distillation recovery of the lower polyethylene polyamines. Commercial Polyamine H is a distillate of a mixture of pentaethylene hexamine and higher polyamines with some minor amounts of lower polyamines. Commercial Polyamine T is a still residue from the distillation of Polyamine H.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a CH$_2$=C< group where at least one of the disconnected valences is attached to an electro-negative group, that is, a group which substantially increases the electrical dissymmetry or polar character of the molecule. Examples of compounds which contain a CH$_2$=C< group and are copolymerizable with butadienes-1,3 are aryl olefines, such as styrene, vinyl toluene, alpha methyl styrene, chlorostyrene, dichlyorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex."

The following examples illustrate the invention. All parts and percentages referred to herein are by weight.

The latices used in the following examples were prepared by polymerizing at 41° F. to approximately 80 percent conversion of monomers to polymer various batches of the following recipe: 70 parts of butadiene-1,3; 30 parts of styrene; 3 parts of potassium oleate; 0.5 part of potassium sulfate; 0.5 part of a condensation product of sodium naphthalene sulfonate and formaldehyde dispersing agent; 0.1 part of mixed (C$_{12}$ to C$_{16}$) tertiary mercaptans; 0.1 part of diisopropyl benzene hydroperoxide; 0.0025 part of ferrous sulfate heptahydrate; 0.0038 part of the tetrasodium salt of ethylene diamine tetraacetic acid, 0.1 part of sodium formaldehyde sulfoxylate; and 150 parts of water. After polymerization to approximately 80% conversion, unreacted butadiene was vented off and unreacted styrene was removed by steam distillation.

Example 1

The latex used in this example had 34.5% solids content, a pH of 9.7, and an average particle diameter of about 600 Angstrom units. To each of four samples A, B, C and D of the latex was added 1.5 parts per 100 parts of latex solids of a condensation product of sodium naphthalene sulfonate and formaldehyde dispersing agent as a 20% aqueous solution. To samples A, B and C were added 0.2 part per 100 parts of latex solids of tetraethylene pentamine, Polyamine H and Polyamine T, respectively, as 10% aqueous solutions. No polyethylene polyamine was added to the control sample D. Carbon dioxide was bubbled through latex samples A, B, C and D at room temperature until the pH of each of the latices was lowered to about 6.5, after which the pH of each was raised to about 9.5 with 28% aqueous ammonia. The latex samples were then concentrated by evaporation in a laboratory disc concentrator. The solids contents of the concentrated latices, A, B, C and D were 55.7%, 57.9%, 60.3% and 52.0%, respectively. The average particle diameters of the concentrated latices A, B, C and D were 1400, 1680, 2000 and 920 Angstrom units, respectively, showing the increase in particle size enlargement in the presence of the polyethylene polyamine.

Example 2

That the concentrating of the latex of enlarged particle size according to the present invention does not appreciably further increase the particle size is shown as follows: A latex of pH of 10.0 and an average particle diameter of 720 Angstrom units was used. There was added to the latex 1.5 parts of a condensation product of sodium naphthalene sulfonate and formaldehyde dispersing agent as a 20% aqueous solution and 0.2 part of Polyamine T as a 10% aqueous solution, per 100 parts of latex solids. Carbon dioxide was bubbled through the latex at room temperature until the pH was lowered to 6.6. The average particle diameter of the latex at this point was 1460 Angstrom units. Ammonia was added as a 28% aqueous solution until the pH was raised to 9.0, at which point the average particle diameter measured 1420 Angstrom units. The latex was then steam distilled to remove the added carbon dioxide and ammonia. The average particle diameter was 1465 Angstrom units. The latex was concentrated to 60.9% solids concentration in a laboratory disc concentrator. The average particle diameter of the concentrated latex was 1495 Angstrom units.

Example 3

Two samples of the latex of Example 2 were treated similarly to Example 2 except that diethylamine and morpholine, respectively, instead of ammonia, were added to raise the pH after the carbon dioxide addition. The final concentrated latices had average particle diameters of 1585 and 1700 Angstrom units, respectively, for the latices with the diethylamine and morpholine additions.

The latices of increased particle size according to the present invention, particularly of high solids content, may be used in the usual applications of latices, as in foam sponge manufacture, tire cord dipping, bonding and impregnating various materials, preparation of adhesives, and the like.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises reducing the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11.

2. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises incorporating in the latex a material that produces hydrogen ions in aqueous medium, said material being in amount to reduce the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11.

3. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter adding ammonia to the latex in amount to increase the pH of the latex to within the range of 8 to 11.

4. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11.

5. The method of increasing the size of the dispersed polymer particles in a synthetic rubber latex of a copolymer of butadiene-1,3 and styrene containing 2 to 100 parts of a water-soluble soap of soap-forming monocarboxylic acid per 100 parts of latex solids and having a pH from 8 to 11 which comprises reducing the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11.

6. The method of increasing the size of the dispersed polymer particles in a synthetic rubber latex of a copolymer of butadiene-1,3 and styrene containing 2 to 10 parts of a water-soluble soap of soap-forming monocarboxylic acid per 100 parts of latex solids and having a pH from 8 to 11 which comprises incorporating in the latex material that produces hydrogen ions in aqueous medium, said material being in amount to reduce the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11.

7. The method of increasing the size of the dispersed polymer particles in a synthetic rubber latex of a copolymer of butadiene-1,3 and styrene containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter adding ammonia to the latex in amount to increase the pH of the latex to within the range of 8 to 11.

8. The method of increasing the size of the dispersed polymer particles in a synthetic rubber latex of a copolymer of butadiene-1,3 and styrene containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11.

9. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50%, and containing 2 to 10 parts of a water-soluble soap of a soap-forming carboxylic acid per 100 parts of latex solids and having a pH from 8 to 11 which comprises reducing the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11, and then increasing the solids content of the latex to within the range of 55% to 70%.

10. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50%, and containing 2 to 10 parts of water-soluble soap of a soap-forming carboxylic acid per 100 parts of latex solids and having a pH from 8 to 11 which comprises reducing the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter increasing the pH of the latex to within the range of 8 to 11, and then evaporating water from the latex until the latex is concentrated to a solids content of 55% to 70%.

11. The method of concentrating a synthetic rubber latex of a copolymer of butadiene-1,3 and styrene having a solids content of 20% to 50%, and containing 2 to 10 parts of a water-soluble soap of soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, and thereafter adding ammonia to the latex in amount to increase the pH of the latex to within the range of 8 to 11, and then evaporating water from the latex until the latex is concentrated to a solids content of 55% to 70%.

12. The method of concentrating a synthetic rubber latex of a copolymer of butadiene-1,3 and styrene having a solids content of 20% to 50%, and containing 2 to 10 parts of a water-soluble soap of a soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.05 to 1% based on the weight of the latex solids of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammnia, and thereafter increasing the pH of the latex to within the range of 8 to 11, and then increasing the solids content of the latex until the latex is concentrated to a solids content of 55% to 70%.

References Cited in the file of this patent

UNITED STATES PATENTS

| | | |
|---|---|---|
| 2,357,861 | Willson | Sept. 12, 1944 |
| 2,548,802 | Linscott | Apr. 10, 1951 |
| 2,839,483 | Howland | June 17, 1958 |

FOREIGN PATENTS

| | | |
|---|---|---|
| 726,466 | Great Britain | Mar. 16, 1955 |